United States Patent
Rao et al.

(10) Patent No.: US 9,843,914 B1
(45) Date of Patent: Dec. 12, 2017

(54) SYSTEM FOR TRANSITING EMERGENCY COMMUNICATIONS

(71) Applicant: AMAZON TECHNOLOGIES, INC., Seattle, WA (US)

(72) Inventors: Siddhartha Shankara Rao, Seattle, WA (US); Samuel Rislove Etler, San Francisco, CA (US); Thaddeus Pritchett, Fall City, WA (US)

(73) Assignee: Amazon Technologies, Inc., Seattle, WA (US)

( * ) Notice: Subject to any disclaimer, the term of this patent is extended or adjusted under 35 U.S.C. 154(b) by 4 days.

(21) Appl. No.: 14/741,198

(22) Filed: Jun. 16, 2015

(51) Int. Cl.
*H04W 4/22* (2009.01)
*H04L 29/06* (2006.01)
*H04W 72/10* (2009.01)
*H04W 76/00* (2009.01)

(52) U.S. Cl.
CPC ........... *H04W 4/22* (2013.01); *H04L 65/1006* (2013.01); *H04L 65/608* (2013.01); *H04W 72/10* (2013.01); *H04W 76/007* (2013.01)

(58) Field of Classification Search
CPC ..... H04W 4/22; H04W 76/007; H04W 72/10; H04L 65/1006; H04L 65/608
USPC ...................................................... 455/404.1
See application file for complete search history.

(56) References Cited

U.S. PATENT DOCUMENTS

| | | | | |
|---|---|---|---|---|
| 2002/0065063 | A1* | 5/2002 | Uhlik | H04W 72/10 455/404.1 |
| 2008/0026781 | A1* | 1/2008 | Ho | H02J 9/02 455/507 |
| 2009/0143046 | A1* | 6/2009 | Smith | H04W 76/007 455/404.1 |
| 2012/0236760 | A1* | 9/2012 | Ionescu | H04W 4/22 370/259 |

* cited by examiner

*Primary Examiner* — Charles Appiah
*Assistant Examiner* — Margaret G Mastrodonato
(74) *Attorney, Agent, or Firm* — Lindauer Law, PLLC

(57) ABSTRACT

Described are techniques for determining an emergency event and associating label data with emergency communications to ensure that the emergency communications are provided with a greater quality and priority than non-emergency communications. When a quantity of communications associated with a network exceeds a threshold value, policy data may be generated and provided to network devices. The policy data may be configured to cause the network devices to transit communications associated with label data with high quality and connectivity. Correspondence between communications from the network and stored values indicative of emergency communications may be used to determine emergency communications from other data. Label data may be associated with the determined emergency communications to cause network devices to transit the communications in the manner indicated by the policy data.

20 Claims, 8 Drawing Sheets

SYSTEM FOR TRANSITING EMERGENCY COMMUNICATIONS

BACKGROUND

Networks may have a limited capacity for handling voice communications, which may negatively affect the quality of the communications during times when a large quantity of communications is transited.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
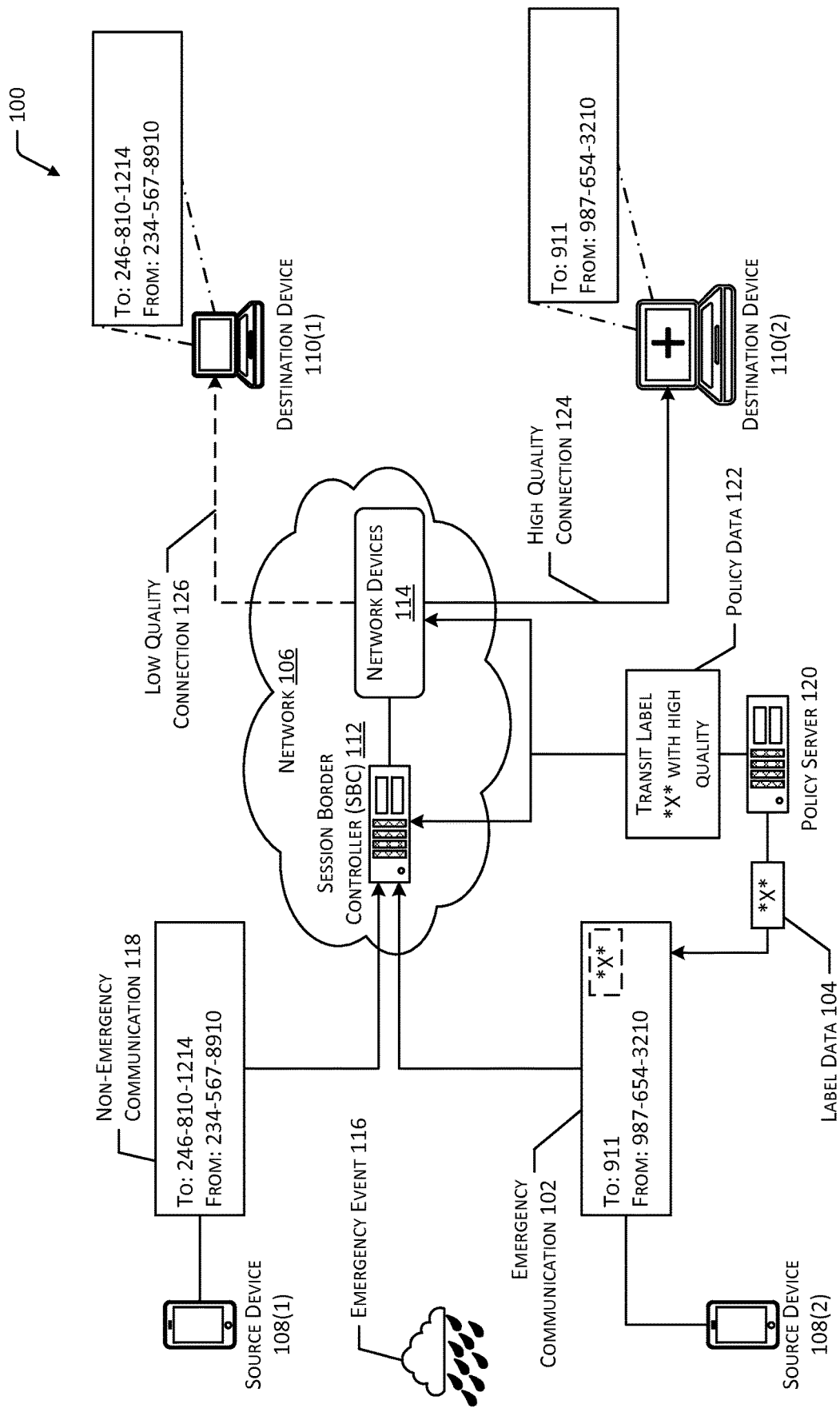
FIG. 1 depicts a system for providing emergency communications with label data to affect the quality and connectivity of the emergency communications.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Communication networks may transit both data and voice communications. For example, voice communications, which may include audio or video communications, may be provided between devices of a network, overlaid on data connections, using Voice over IP (VoIP) techniques. To communicate with a destination device, a source device may establish one or more of a Session Initiation Protocol (SIP) connection or a Real-time Transport Protocol (RTP) connection with a network associated with the destination device. For example, a connection may be established with a switch, a session border controller (SBC), or other types of devices associated with the network, which may in turn route voice packets to an endpoint of the network. If the destination device is part of the network, the endpoint may include the destination device. In other implementations, the endpoint may transit the communication to the destination device, such as through physical cables or via another network, such as the public switched telephone network (PSTN). Network devices may be configured to prioritize voice communications over other data communications, such as by using a Multiprotocol Label Switching (MPLS) label, an Internet Protocol (IP) address, a Media Access Control (MAC) address, or other identifiers to recognize and differentiate voice communications from other data. A portion of a network's maximum bandwidth may be allocated for use with voice communications to ensure the quality and connectivity of the voice communications. For example, a network may include a fixed quantity (e.g., one gigabit) of bandwidth, a percentage of bandwidth (e.g., one percent), or an amount of bandwidth based on a quantity of voice communications (e.g., 4,000 voice communication sessions), that is retained specifically for use with voice communications.

When an unusually large quantity of voice communications is transited within a network, the quality and connectivity of the voice communications may be negatively affected. For example, under normal circumstances, from ten percent to twenty percent of a network's endpoint devices may be utilized. However, during an emergency event, sixty percent to seventy percent of the network's endpoint devices may be utilized. Emergency events may include any danger to life, health, property, or environment. For example, an emergency event may include a natural disaster or severe weather, a failure of physical or technological infrastructure in an area, a military event or attack, a criminal activity, an epidemic, and so forth. In some implementations, an emergency event may include an event that is generally planned. For example, a known event taking place at a selected date and time, such as a sporting event, may result in greater network utilization. Due to the fact that the date and time of the event are known, a network may be structured to accommodate greater utilization during the event. However, in some cases, a planned event may still constitute an emergency event. For example, the quantity of network resources utilized during an event may far exceed the quantity that was planned, resulting in a decrease in the quality and connectivity of voice communications, a failure of technical infrastructure, and so forth. In some implementations, any event that causes a quantity of voice communications or a bandwidth associated with voice communications to exceed a threshold quantity associated with a network may constitute an emergency event. In other implementations, an emergency event may be determined manually, independent of the bandwidth associated with communications over a network.

Because the quantity of voice communications received by a network during an emergency may exceed the quantity of bandwidth allocated for voice communications, emergency communications, such as voice calls to law enforcement, first responders, medical personnel, and so forth, may be of poor quality, or the emergency communications may fail altogether. During an emergency, however, at least a portion of the increased quantity of voice communications may include non-emergency communications. For example, an individual located in an area affected by an emergency may attempt to communicate with friends or family members. These and other non-emergency communications may cause more critical emergency communications to fail or to be transited with reduced quality. Large networks with excess resources may continuously dedicate a portion of their resources (e.g., bandwidth, processing, and so forth) specifically to transiting of emergency communications, and retain these resources in an inactive state in the absence of an emergency. However, this use of resources may not be feasible or cost-effective for all networks.

Described in this disclosure are techniques for ensuring that emergency communications are transited with a greater quality and priority than non-emergency communications without requiring the continuous dedication of resources to emergency communications. An emergency communication may include any exchange of data between parties to address an emergency event, such as communications to or between law enforcement, medical personnel, or rescue personnel, requests for assistance, and so forth. For example, an emergency communication may include an audio communication, a video communication, a text message, an e-mail, or other transmissions of data via a network or between communication devices.

Communication metadata indicative of voice communications associated with a network may be accessed to determine a quantity of voice communications received by the network over a period of time. For example, communication metadata may include pen register data or call detail records (CDR) for previously-completed communications for a particular time period and a list of voice communications that are currently occurring using the network. The presence of an emergency may be determined if the communication metadata exceeds a threshold value. The threshold value may be based on the capacity of the network to transit voice communications. For example, the threshold value may include one or more of a quantity of voice communications, a quantity of emergency communications, a rate of change associated with a quantity of voice or emergency communications, a selected portion of the maximum bandwidth for voice communications associated with the network, and so forth. In other implementations, the presence of an emergency may be determined manually. For example, a weather service may indicate an imminent natural disaster, responsive to which a user may manually provide an indication of an emergency event, independent of the quantity of communications associated with the network.

Responsive to the determination of the emergency, a communication policy may be generated and provided to at least a portion of the devices associated with the network. For example, a policy engine or SBC may generate the communication policy and provide the communication policy to one or more routers, switches, access points, SBCs, servers, endpoints, or other types of computing devices in communication with the network. The communication policy may be configured to cause devices receiving the policy to determine emergency communications from other non-emergency data and to transit the emergency communications with a selected priority and quality. For example, the communication policy may include an indication of label data associated with the emergency communications. The label data may include modifications to a SIP header of an emergency communication or data that is transited with the emergency communication that may be determined by a network device receiving the emergency communication. Responsive to determination of the label data, the receiving network device may transit the associated emergency communication in a manner indicated by the communication policy. For example, the communication policy may include policy data configured to cause devices associated with the network to transit emergency communications prior to non-emergency communications, to transit emergency communications with a greater quality than non-emergency communications, and so forth, responsive to the label data.

Correspondence between the voice communications associated with the network and one or more identifiers indicative of emergency communications may be used to determine emergency communications from other data. This correspondence may be determined for voice communications currently occurring over the network at the time an emergency is occurring and for subsequent communications that are initiated during the emergency event. Identifiers indicative of an emergency communication may include one or more portions of the SIP header of the emergency communication, such as a "to" field indicative of the destination device, a "from" field indicative of the source device, and so forth. Identifiers may also include an IP address, a MAC address, or another type of network address or network identifier (such as uniform resource identifier (URI) or uniform resource locator (URL)) associated with the sending or receiving device. For example, if an emergency affecting a particular building is determined, voice communications to or from IP addresses associated with the particular building may be used to categorize the voice communications as emergency communications. In some implementations, identifiers of emergency communications may include a portion of a dial string parameter, such as "911" for emergency communications in the United States or "112" for emergency communications in Europe.

Responsive to determination of an emergency communication, the label data may be associated with the emergency communication. The label data may enable other devices within the network to determine the nature of the emergency communication independent of other data associated with the emergency communication. For example, the communication policy may cause devices within the network to transit the emergency communication responsive to the label data without determining one or more portions of the SIP header or other data associated with the emergency communication. Other non-emergency communications that lack the label data may be transited with lower priority or lower quality. In some implementations, one or more non-emergency communications may be disconnected from the network to enable additional bandwidth to be used transiting emergency communications. In other implementations, if the bandwidth associated with the emergency communications exceeds the maximum bandwidth for voice communications associated with the network, the amount of bandwidth allocated for emergency communications may be increased.

An end of the emergency may be determined if the communication metadata does not meet a threshold value. For example, if the quantity of voice communications or emergency communications received by a network does not exceed a threshold quantity for a period of time, this determination may indicate that voice communications associated with the emergency are no longer impacting the quality or connectivity of emergency communications. In other implementations, an end to an emergency event may be provided manually, such as by user input. Responsive to the end of the emergency, one or more of the communication policy or the label data may be deleted. In other implementations, the communication policy or label data may be configured to expire subsequent to a period of time, after which the communication policy or label data may be deleted. In still other implementations, the communication policy or the label data may persist until manually deleted. Deletion of the communication policy or label data and generation of a new communication policy or label data upon determination of a subsequent emergency may improve efficiency by eliminating the need to modify multiple fields and routing behaviors associated with the communication policy and the label data at the beginning and end of emergency events.

While implementations described in this disclosure may relate to the determination of emergency events and the use of label data in conjunction with emergency communications, in other implementations, communication policies and label data may be used with other categories of communications. For example, the quantity of voice communications received by a network may increase during public events (e.g., sporting events, concerts, conventions, product launches, and so forth). Communications determined to be associated with event administrators may be provided with label data to affect the quality and connectivity or other communication characteristics of these communications during the event. As another example, a particular event, such as a software update, may cause a large number of voice communications to be initiated from a particular geographic region sufficient to negatively impact other communications. Communications determined to be associated with the particular geographic region may be provided with label data to decrease the quality and connectivity of the communications to increase the available bandwidth for use with other types of communications. Additionally, while implementations described in this disclosure may focus primarily on voice communications associated with a network as one example, in other implementations, emergency communications may include images, text based messages, or other content. Communication policies and label data may be generated to affect the manner in which any type of communication is transited by one or more network devices.

FIG. 1 depicts a system 100 for providing emergency communications 102 with label data 104 to affect the quality and connectivity of the emergency communications 102. One or more networks 106 may be used to route voice communications from source devices 108 to destination devices 110. The source device(s) 108 and destination device(s) 110 may include any manner of computing device or telecommunication device, such as a telephone, mobile device, smartphone, set-top box, tablet computer, personal computer, wearable computer, and so forth. The network(s) 106 may include LANs, wireless LANs, WANs, wireless WANs, and so forth. For example, the network(s) 106 may accommodate devices compatible with Ethernet, Wi-Fi™, Bluetooth®, ZigBee®, Z-Wave, 3G, 4G, LTE, and so forth.

The voice communications may include one or more of VoIP communications, Voice over Long Term Evolution (VoLTE) communications, or video communications. Voice communications may occur through the transmission of data packets between the source device(s) 108, the destination devices 110, and devices associated with the network 106. The packets containing audio data or video data associated with the voice communications may be provided using one or more of a SIP connection or a RTP connection. The SIP or RTP connection may be initiated by accessing a SBC 112 or similar device associated with the network 106. The SBC 112 may route the communication through one or more network devices 114 to reach the endpoint of the connection.

Network devices 114 may include modems, routers, access points, servers, computing devices, telecommunication devices, telephone exchanges (e.g., a private branch exchange (PBX)), computer clusters, other SBCs 112, and so forth. In some implementations, the endpoint of the connection may include a destination device 110 associated with a recipient of the communication. In other implementations, the endpoint may include a device associated with an egress point at which the communication ceases to be transmitted as data packets over the SIP or RTP connection, such as a device that transcodes and provides the voice communication to a local telephone system. For example, data packets that reach an endpoint of a SIP connection may be converted to audio or video data and provided to the local telephone system via physical cables.

FIG. 1 depicts an emergency event 116 affecting a user or location associated with a first source device 108(1) and a second source device 108(2). During an emergency event 116, the quantity of voice communications routed using the network 106 may increase significantly, which may negatively impact the quality and connectivity of emergency communications 102 associated with the network 106. At least a portion of the voice communications provided to the network 106 during the emergency event 116 may include non-emergency communications 118. For example, FIG. 1 depicts the first source device 108(1) providing a non-emergency communication 118 to the SBC 112, e.g., via a SIP or RTP connection, for receipt by a first destination device 110(1). FIG. 1 depicts the second source device 108(2) providing an emergency communication 102 to the SBC for receipt by a second destination device 110(2). Continuing the example, the first destination device 110(1) may be associated with a family member of a user associated with the first source device 108(1). The second destination device 110(2) may be associated with medical personnel equipped to respond to the emergency event 116. An increased quantity of non-emergency communications 118 received by the network 106 during the emergency event 116 may reduce the quality by which the emergency communications 102 are transited and may possibly cause one or more emergency communications 102 to fail.

Responsive to determination of the emergency event 116, a policy server 120 in communication with the network 106 may provide policy data 122 to one or more of the SBC 112 or the network devices 114. While FIG. 1 depicts the policy server 120 as a server, the policy server 120 may include one or multiple communication devices of any type. Additionally, while FIG. 1 depicts the policy server 120 external to the network 106, in some implementations, the policy server 120 may be associated with the network 106. In other implementations, the SBC 112 or one or more of the network devices 114 may perform the functions of the policy server 120, and use of a separate policy server 120 may be omitted. FIG. 1 depicts the policy server 120 providing the policy data 122 to the SBC 112 and the network devices 114. In other implementations, the policy server 120 may provide the policy data 122 to a single device (e.g., the SBC 112) or a portion of the devices associated with the network 106, which may in turn provide the policy data 122 to other network devices 114.

The policy data 122 may include an indication of the label data 104 and instructions regarding the manner in which communications associated with the label data 104 are to be transited. For example, the policy data 122 may be configured to cause one or more of the SBC 112 or the network devices 114 to prioritize the transit of communications associated with the label data 104. Continuing the example, the policy data 122 may cause the one or more of the SBC 112 or the network devices 114 to transit communications associated with the label data 104 using a high quality connection 124. As contrasted to a "low quality connection" 126, a "high quality connection" 124 may include a connection associated with a greater quantity of bandwidth, processing resources, and so forth, configured to improve the quality and connectivity of a voice communication.

The policy server 120 may determine one or more emergency communications 102 from other data provided to the network 106 and associate the label data 104 with the emergency communications 102. For example, the policy server 120 may determine correspondence between stored emergency data and one or more of a "To" field or a "From" field of a SIP header associated with the emergency communication 102. In other implementations, the policy server 120 may determine correspondence between the emergency data and a dial string associated with the emergency communication 102. In still other implementations, the policy server 120 may determine correspondence between emergency data associated with the emergency event 116 and an IP address or other network identifier of a source device 108 sending the emergency communication 102. In some implementations, association of the label data 104 with the emergency communication 102 may include editing a portion of the emergency communication 102, such as a SIP header thereof. In other implementations, the label data 104 may be transited with the emergency communication 102 without editing the emergency communication 102.

Figure 2:
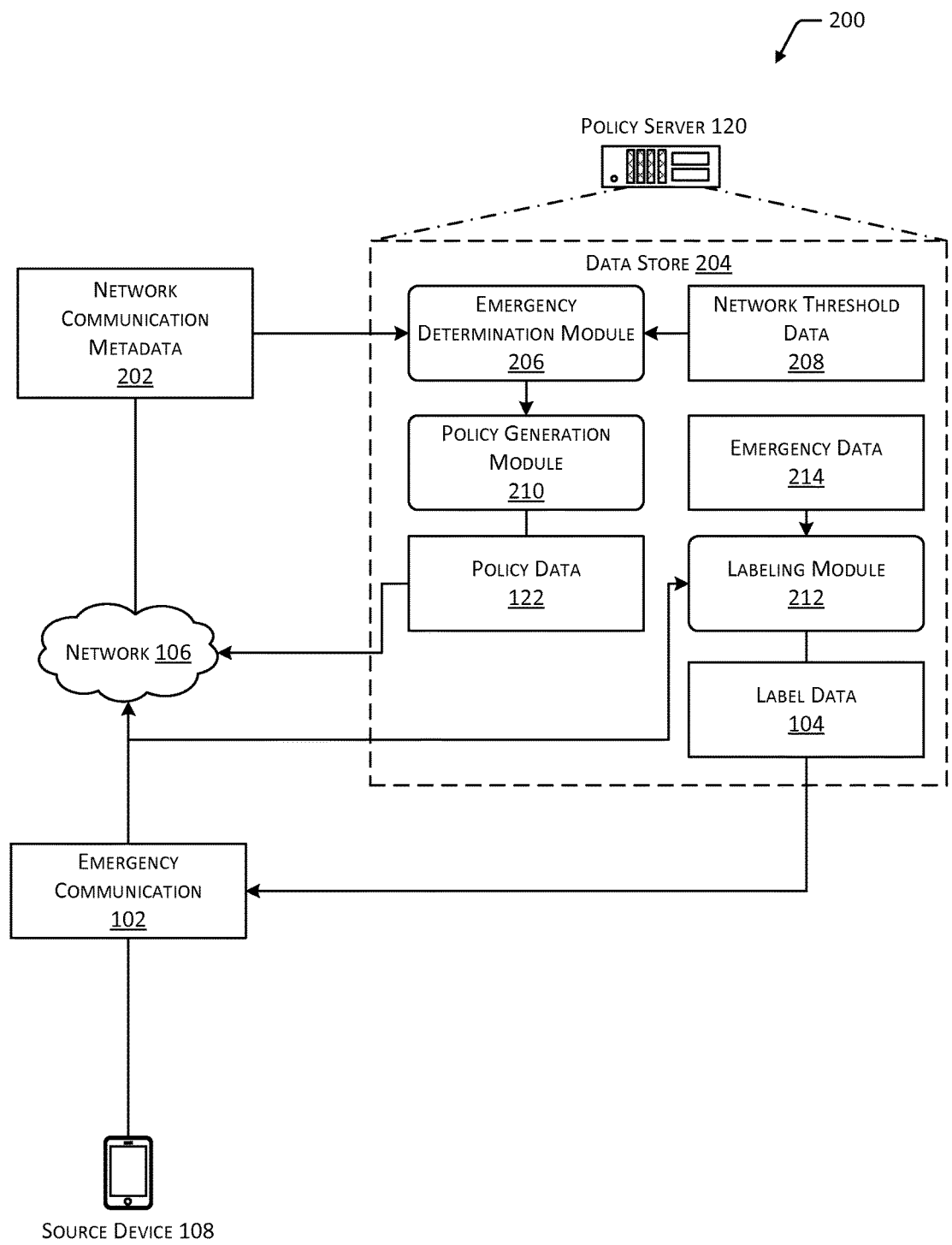
FIG. 2 depicts a system for determining emergency events and determining emergency communications associated with a network.

FIG. 2 depicts a system 200 for determining emergency events 116 and determining emergency communications 102 associated with a network 106. The policy server 120 may determine network communication metadata 202 from the network 106. For example, one or more network devices 114 may provide the network communication metadata 202 to the policy server 120, or the policy server 120 may access one or more network devices 114 to access the network communication metadata 202. The network communication metadata 202 may be indicative of a quantity of voice communications or other types of communications transited by the network 106 over a period of time. For example, the network communication metadata 202 may include a log of voice communications previously transited by the network 106, such as a CDR. The network communication metadata 202 may also include an indication of communications currently occurring using the network 106, such as a log of SIP or RTP connections currently open between the SBC 112 and one or more other computing devices.

A data store 204 associated with the policy server 120 may store an emergency determination module 206. The emergency determination module 206 may determine correspondence between the network communication metadata 202 and network threshold data 208. The network threshold data 208 may be indicative of one or more threshold values associated with the network 106. For example, the network threshold data 208 may include one or more of a maximum bandwidth for voice communications associated with the network 106, a threshold quantity of voice communications, a threshold bandwidth of voice communications, a threshold quantity of emergency communications 102, or a threshold bandwidth of emergency communications 102. Network threshold data 208 may similarly include threshold values associated with other types of communications. In some implementations, the network threshold data 208 may include values associated with the network 106 as a whole, such as a maximum bandwidth for all communications. The emergency determination module 206 may determine that one or more values indicted by the network communication metadata 202 equals or exceeds one or more values indicated by the network threshold data 208 to determine an emergency event 116. The determination of the emergency event 116 may be provided to a policy generation module 210 stored in the data store 204.

The policy generation module 210 may generate policy data 122 based at least partially on one or more of the determination of the emergency event 116, the network communication metadata 202, the network threshold data 208, or other configurations associated with the policy server 120. In some implementations, the policy generation module 210 may also generate the label data 104. The policy data 122 may include an indication of the label data 104 configured to enable devices associated with the network 106 to determine emergency communications 102 by determining the associated label data 104. The policy data 122 may also include instructions configured to cause devices associated with the network 106 to transit communications associated with the label data 104 in a particular manner. For example, the policy data 122 may be configured to cause emergency communications 102 associated with the label data 104 to be communicated using a high quality connection 124. In other implementations, the policy data 122 may be configured to cause emergency communications 102 associated with the label data 104 to be transited prior to non-emergency communications 118. In still other implementations, the label data 104 may instead be associated with one or more categories of non-emergency communications 118, and the policy data 122 may be configured to cause non-emergency communications 118 associated with the label data 104 to be communicated with a lesser priority or using a low quality connection 126.

A labeling module 212 stored in the data store 204 may determine emergency communications 102 from other data associated with the network 106. To determine an emergency communication 102, the labeling module 212 may communicate with one or more of the source device 108 providing the emergency communication 102 or a device (e.g., a SBC 112 or other network device 114) associated with the network 106. The labeling module 212 may determine correspondence between at least a portion of an emergency communication 102 and emergency data 214 indicative of fields or parameters associated with emergency communications 102. For example, the emergency data 214 may include fields of a SIP header associated with emergency events 116, such as a "To" field associated with law enforcement, a medical facility, or emergency response personnel. As another example, the emergency data 214 may include a dial string associated with emergency events 116, such as "911" in the United States, "112" in Europe, or a telephone number associated with law enforcement, a medical facility, or emergency response personnel.

In some implementations, a location associated with an emergency event 116 may be determined by the policy server 120. One or more IP addresses or other network addresses associated with the location affected by the emergency event 116 may be stored as emergency data 214. The labeling module 212 may then determine correspondence between the emergency data 214 and the source or destination network address of an emergency communication 102. As another example, a location associated with an emergency event 116 may be determined using one or more location systems associated with a network 106, a source device 108, a destination device 110, or the policy server 120. For example, a radio navigation-based system, such as a terrestrial or satellite-based navigational system, may be used to determine a current location of a device within a threshold distance of an emergency event 116. Satellite-based navigational systems may include a Global Positioning System (GPS) receiver, a Global Navigation Satellite System (GLONASS) receiver, a Galileo receiver, a BeiDou Navigation Satellite System (BDS) receiver, an Indian Regional Navigational Satellite System, and so forth. The labeling module 212 may then determine correspondence between the emergency data 214 and the determined location of a source device 108 or a destination device 110. Based on this correspondence, the labeling module 212 may determine that a communication provided by the source device 108 is an emergency communication 102.

Responsive to determining that a communication is an emergency communication 102, the labeling module 212 may associate the label data 104 with the emergency communication 102. In some implementations, the labeling module 212 may generate the label data 104. In other implementations, the policy generation module 210 may generate label data 104 associated with the policy data 122. The label data 104 may include any manner of machine-readable data able to be determined by the SBC 112 or one or more network devices 114. For example, the label data 104 may include a reference or indication to a particular policy data 122 configured to cause a network device 114 receiving the label data 104 to transit the associated communication in the manner indicated by the referenced policy data 122. In some implementations, associating the label data 104 with an emergency communication 102 may include adding the label data 104 to the emergency communication 102 as one or more of a header, a new field, a portion of the body of the communication, and so forth. In other implementations, associating the label data 104 with the emergency communication 102 may include editing or replacing a portion of the emergency communication 102. For example, the label data 104 may replace at least a portion of a SIP header associated with the emergency communication 102. In still other implementations, associating the label data 104 with the emergency communication 102 may include transiting the label data 104 with the emergency communication 102 when the emergency communication 102 is transmitted between network devices 114. Independent of the manner in which the label data 104 is associated with the emergency communication 102, the label data 104 may be determined by one or more of the SBC 112 or the network devices 114 as the emergency communication 102 is transited within the network 106. Determination of the label data 104 by the SBC 112 or the network devices 114 may cause the SBC 112 or the network devices 114 to transit the emergency communication 102 in the manner indicated by the policy data 122.

Figure 3:
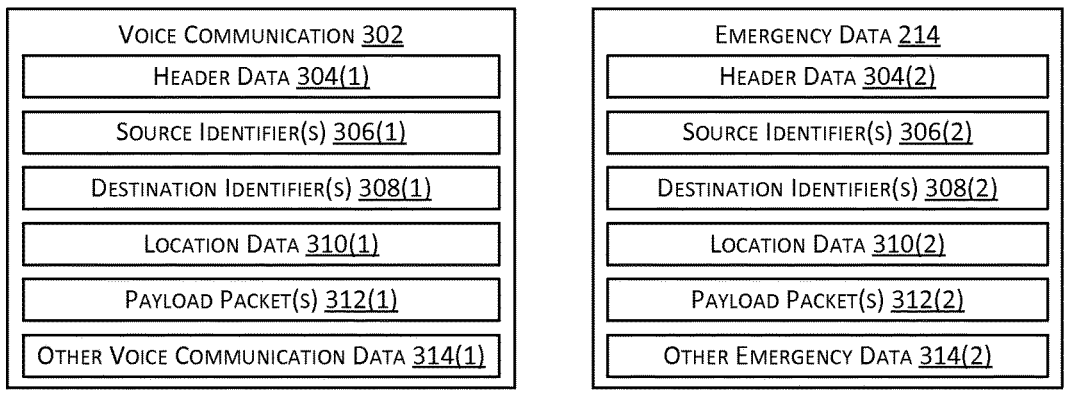
FIG. 3 depicts a block diagram illustrating examples of voice communications, emergency data, network communication metadata, network threshold data, and policy data.
Figure 3:
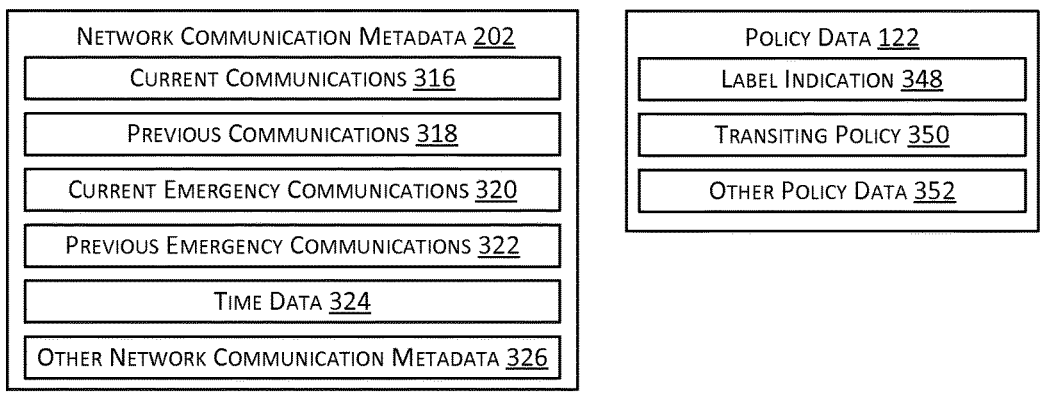
Figure 3:
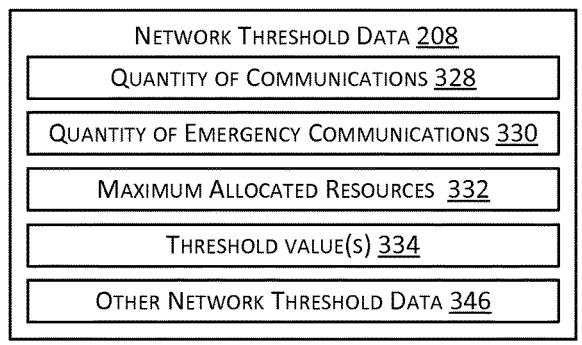

FIG. 3 depicts a block diagram 300 illustrating examples of voice communications 302, emergency data 214, network communication metadata 202, network threshold data 208, and policy data 122.

Voice communications 302 may include one or more of audio data or video data for transmission between one or more source devices 108 and destination devices 110. For example, voice communications 302 may include emergency communications 102 and non-emergency communications 118. In some implementations, voice communications 302 may be configured for transmission between devices using one or more of a SIP or RTP connection. Voice communications 302 are a single example of a type of communication that may be used in conjunction with policy data 122 and label data 104 to facilitate the transiting of emergency communications 102. In other implementations, emergency communications 102 may include other types of real-time communications, or one or more types of store-and-forward communications, such as text messages, e-mails, other types of alphanumeric data, image data, and so forth. For example, an emergency communication 102 may include a "text-to-911" message provided to a Public Safety Answering Point (PSAP). As another example, an emergency communication 102 may include an e-mail provided to a hospital or other medical or rescue personnel. As yet another example, an emergency communication 102 may include an image depicting an area or an injury to a person, which may be provided to medical or emergency response personnel.

A voice communication 302 may include header data 304(1). Header data 304(1) may include one or more fields within a SIP header associated with the voice communication 302. A "From" field of a SIP header may indicate the source device 108 from which the voice communication 302 is sent. A "To" field of the SIP header may indicate the destination device 110 to which the voice communication 302 is sent. Similarly, header data 304(1) may include data corresponding to a "Request-Line-URI" field, a "Via" field, a "Contact" field, an "Allow" field, other fields within the SIP header, and so forth.

Voice communications 302 may also include one or more source identifiers 306(1) indicative of the source device 108 from which the voice communication 302 is sent. Voice communications 302 may further include one or more destination identifiers 308(1) indicative of the destination device 110 to which the voice communication is sent. Source identifiers 306(1) and destination identifiers 308(1) may include network identifiers associated with a source device 108 or destination device 110, such as an IP address, a MAC address, a name of a device on a network, indicators of particular hardware or software components of a source device 108 or destination device 110, and so forth.

Voice communications 302 may additionally include location data 310(1). Location data 310(1) may include GPS coordinates, or other types of data associated with a navigation system, indicative of the location of a source device 108 or destination device 110. In some implementations, an IP address or other type of network address may function as location data 310(1). For example, an IP address may be used to determine a location associated with a source device 108 or a destination device 110.

Voice communications 302 may also include payload packets 312(1), which may include the actual data or body data for communicating information to a recipient of the voice communication 302. For example, the payload packets 312(1) may include audio data, video data, image data, alphanumeric data, haptic data, and so forth, configured to generate an output at a receiving device.

Other voice communication data 314(1) may include encryption schemes associated with the voice communications 302. Other voice communication data 314(1) may also include, configurations, settings, protocols, and so forth associated with one or more of the source device 108 or the destination device 110. In some implementations, other voice communication data 314(1) may include one or more user accounts associated with a source device 108 or a destination device 110. For example, user account data may include an address associated with a user of a device, which may be used to determine a location of the device or to function as a source identifier 306(1) or a destination identifier 308(1). As another example, user account data may indicate that a particular source device 108 or destination device 110 is associated with law enforcement, a medical facility, emergency response personnel, and so forth. Communications provided to such a destination device 110 may be determined to be emergency communications 102. In some implementations, communications provided between devices associated with law enforcement, a medical facility, emergency response personnel during an emergency event 116 may also be determined to be emergency communications 102.

Emergency data 214 may be used to determine whether a voice communication 302 is an emergency communication 102 or a non-emergency communication 118. As described previously with regard to FIG. 2, the labeling module 212 may determine correspondence between the emergency data 214 and at least a portion of a voice communication 302. Based on the correspondence, the voice communication 302 may be determined to be an emergency communication 102. Responsive to this determination, the labeling module 212 may associate labeling data 104 with the emergency communication 102.

The emergency data 214 may include header data 304(2). The header data 304(2) may include values for one or more fields of a SIP header that may indicate an emergency communication 102, such as a "To" field addressed to law enforcement, a medical facility, or emergency response personnel. The header data 304(2) may also include values for a "From" field, a "Request-Line-URI" field, a "Via" field, a "Contact" field, an "Allow" field, other fields within the SIP header, and so forth, that may indicate an emergency communication 102.

The emergency data 214 may also include source identifiers 306(2) and one or more destination identifiers 308(2). Source identifiers 306(2) and destination identifiers 308(2) may include network identifiers or other types of identifiers associated with source devices 108 and destination devices 110 that may be used to determine devices associated with an emergency event 116. For example, source identifiers 306(2) and destination identifiers 308(2) may include an IP address, a MAC address, a name of a device on a network, indicators of particular hardware or software components of a source device 108 or destination device 110, and so forth. Continuing the example, if an emergency event 116 is determined to affect a particular location associated with one or more IP addresses, the associated IP addresses may be stored as emergency data 214. Correspondence between the IP addresses of the emergency data 214 and those associated with the emergency event 116 may be used to identify particular voice communications 302 as emergency communications 102.

The emergency data 214 may further include location data 310(2). Location data 310(2) may include GPS coordinates, or other types of data indicative of the location of a device associated with an emergency event 116. In some implementations, an IP address or other type of network address may function as location data 310(2). For example, an IP address may be used to determine a location associated with a source device 108 or a destination device 110 proximate to an emergency event 116.

The emergency data 214 may also include payload packets 312(2). The payload packets 312(2) of the emergency data 214 may correspond to particular audio or video content indicative of a message associated with an emergency event 116. For example, the payload packets 312(2) may include requests for assistance, words or images commonly conveyed when seeking assistance from emergency response personnel, and so forth. Correspondence between the payload packets 312(2) of the emergency data 214 and the payload packets 312(1) of a voice communication 302 may indicate that the content of the voice communication 302 is indicative of an emergency communication 102.

Other emergency data 314(2) may include device data indicative of one or more hardware or software components associated with source devices 108 or destination devices 110. Other emergency data 314(2) may also include indications of settings, configurations, or protocols that may be used by one or more devices. For example, particular configuration settings may be used to identify a particular device or a location associated with the device. In some implementations, other emergency data 314(2) may include one or more user accounts associated with a source device 108 or a destination device 110. For example, user account data may include an address associated with a user of a device, which may be used to determine that a user resides in a location affected by an emergency event 116. As another example, user account data may indicate that a particular source device 108 or destination device 110 is associated with law enforcement, a medical facility, emergency response personnel, and so forth. Emergency data 214 may be used to cause communications provided between such devices to be determined to be emergency communications 102.

Network communication metadata 202 may include data provided by a network 106 that indicates current and previous communications associated with the network 106 over a period of time. Correspondence between the network communication metadata 202 and the network threshold data 208 may be used to determine an emergency event 116.

The network communication metadata 202 may include data indicative of current communications 316 (e.g. voice communications 302 or other types of communications). The current communications 316 may include a log, table, list, or other format indicative of one or more of the devices or sessions currently associated with a voice communication 302 or other type of communication using the network 106. For example, the current communications 316 may include a list of devices having an open SIP or RTP connection with the network 106.

The network communication metadata 202 may also include data indicative of previous communications 318. For example, the network communication may include a CDR or another type of log or record indicating voice communications 302 that were previously initiated using the network 106. The data indicative of previous communications 318 may indicate times at which prior communications were initiated or ended, whether the communications were disconnected prior to completion, and so forth.

The network communication metadata 202 may further include data indicative of current emergency communications 320. For example, a voice communication 302 or other type of communication may be determined to be an emergency communication 102 based at least partially on correspondence with the emergency data 214 or based on one or more determinations made by network devices 114. The data indicative of current emergency communications 320 may include a log, table, list, or other format indicative of one or more of the devices or sessions currently associated with an emergency communication 102.

The network communication metadata 202 may also include data indicative of previous emergency communications 322. For example, a CDR or other log of previous voice communications 302 may be used to determine a list, log, table, or other type of record indicative of emergency communications 102 previously initiated with the network 106 and terminated. In some implementations, the data indicative of previous emergency communications 322 may include an indication regarding whether an emergency communication 102 was completed successfully prior to termination.

The network communication metadata 202 may include time data 324. Time data 324 may include the times at which communications are initiated and terminated, the duration of communications, and so forth. In some implementations, the time data 324 may be used to determine the proximity of one or more communications to scheduled events that may impact the quality or connectivity of the communications. For example, based on time data 324 indicating an upcoming event that may increase the voice communications 302 received by a network 106, policy data 122 may be preemptively created to cause voice communications 302 having a particular category to be transited in a selected manner. Time data 324 may also be used to determine periods of time over which quantities of voice communications 302 or emergency communications 102 occurred. For example, a threshold value corresponding to a quantity of voice communications 302 may include a count of voice communications 302 over a selected period of time, such as five minutes, one hour, or one day.

Other network communication metadata 326 may include one or more configurations, settings, protocols, and so forth associated with the network 106. Other network communication metadata 326 may also include quantities of bandwidth associated with one or more of the current communications 316, previous communications 318, current emergency communications 320, or previous emergency communications 322.

Network threshold data 208 may be used to determine an emergency event 116 based on correspondence between the network communication metadata 202 and the network threshold data 208. For example, an emergency event 116 may be determined if one or more values of the network communication metadata 202 exceed one or more values of the network threshold data 208. The network threshold data 208 may include a quantity of communications 328 (e.g., voice communications 302 or other types of communications). For example, the quantity of communications 328 may include a count of voice communications 302 or an amount of bandwidth or other computing resources associated with voice communications 302 at a particular instant or over a period of time.

Network threshold data 208 may also include a quantity of emergency communications 330. As described previously, a voice communication 302 or other type of communication may be determined to be an emergency communication 102 based at least partially on correspondence with the emergency data 214 or based on one or more determinations made by network devices 114. The quantity of emergency communications 330 may include a count of emergency communications 102 or an amount of bandwidth or other computing resources associated with emergency communications 102 at a particular instant or over a period of time.

Network threshold data 208 may further include data indicative of maximum allocated resources 332 associated with the network 106. The maximum allocated resources 332 may be indicative of a threshold amount or a maximum amount of bandwidth, processing capability, or other computing resources that may be used to transit voice communications 302 or emergency communications 102 at a particular instant or over a period of time. For example, if the network threshold data 208 lacks a value specifically associated with voice communications 302 or emergency communications 102 received by the network 106, communications that equal or exceed the maximum allocated resources 332 may be used to determine an emergency event 116.

Network threshold data 208 may additionally include one or more threshold values 334. Threshold values 334 may include quantities and ranges of quantities associated with one or more of the quantity of communications 328, the quantity of emergency communications 330, or the maximum allocated resources 332. For example, an emergency event 116 may be determined if communications received by the network 106 are within a threshold value 334 of the maximum allocated resources 332.

Other network threshold data 346 may include capabilities or capacities of particular network devices 114, configurations, settings, or protocols of one or more network devices 114, and so forth that may affect the quantities of communications able to be transited by at least a portion of the network 106.

Policy data 122 may be configured to cause devices associated with the network 106 to transit particular voice communications 302, such as emergency communications 102, in specific manner. The policy data 122 may be provided to network devices 114 to cause the network devices 114 to handle at least a portion of received voice communications 302 in a manner indicated by the policy data 122.

The policy data 122 may include a label indication 348 which may be indicative of one or more types of label data 104. The label data 104 may be associated with emergency communications 102 by the labeling module 212. In some implementations, the label data 104 may include a reference to particular policy data 122. In other implementations, the policy data 122 may include a reference to a particular label data 104. In still other implementations, a particular policy data 122 and an associated label data 104 may reference one another. The label indication 348 may be configured to cause devices receiving the policy data 122 to determine voice communications 102 having the associated label data 104.

The policy data 122 may also include a transiting policy 350, which may include instructions configured to cause devices receiving a communication associated with label data 104 to handle the communication in a manner specified by the transiting policy 350. For example, the transiting policy 350 may cause devices to transit a voice communication 302 using a high quality connection 124, a low quality connection 126, another type of connection, a specific protocol, and so forth. In other implementations, the transiting policy 350 may cause devices to transit a voice communication 302 at a particular time, after a period of time subsequent to receiving the voice communication 302, prior to one or more other communications, subsequent to one or more other communications, concurrent with one or more other communications, and so forth. In still other implementations, the transiting policy 350 may cause devices to transit a voice communication 302 to a particular location, route a voice communication 302 through particular network devices 114, and so forth.

Other policy data 352 may include additional label indications 348. For example, policy data 122 may include multiple transiting policies 350 associated with different types of communications. As another example, a single transiting policy 350 may include instructions regarding the transiting of multiple communications. Other policy data 352 may further include a timestamp or similar data, which may be used to determine whether a first policy data 122 is more current than a second policy data 122. For example, policy data 122 may be configured to expire after a particular quantity of time.

Figure 4:
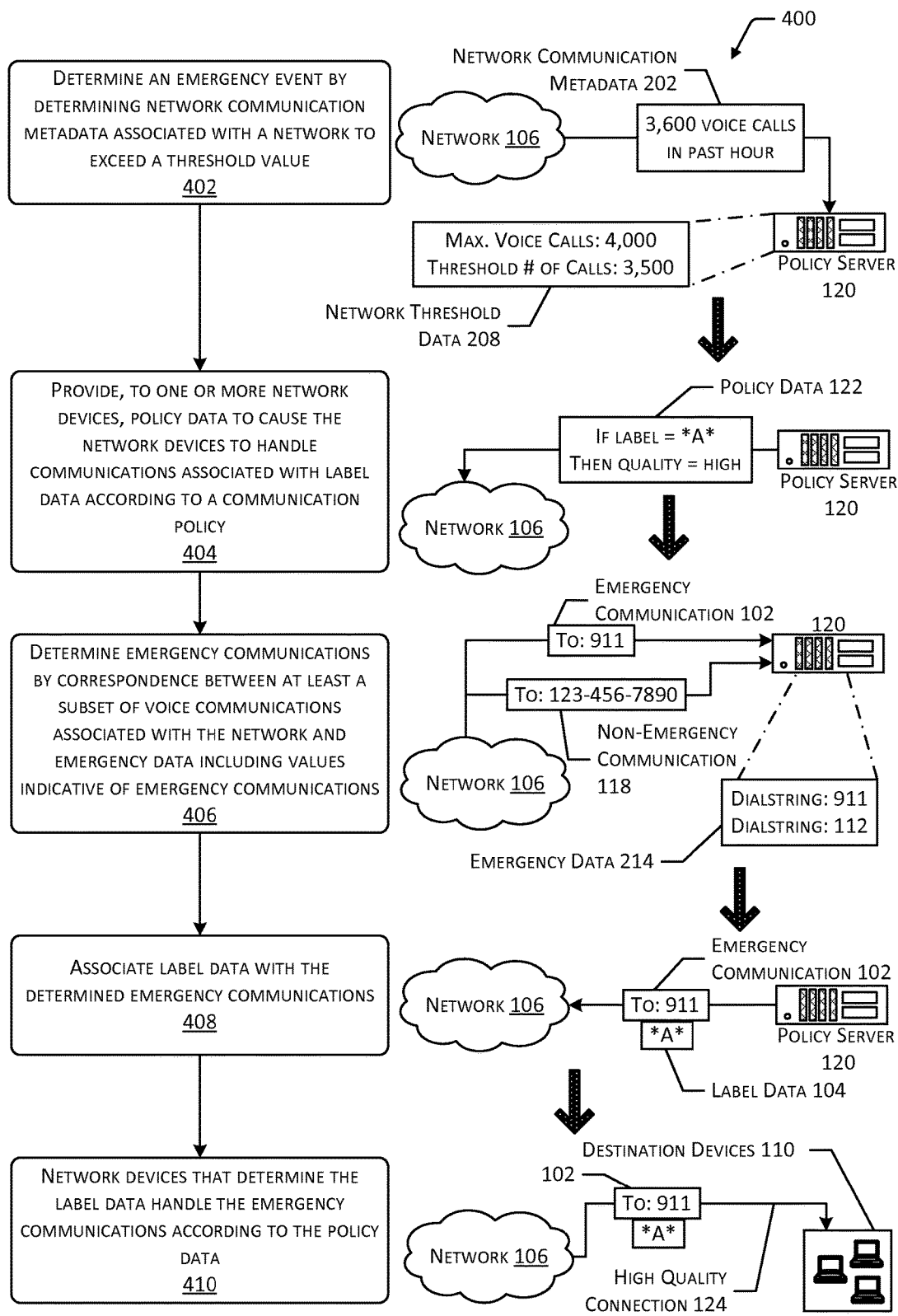
FIG. 4 depicts a method for determining emergency events and handling emergency communications.

FIG. 4 depicts a method 400 for determining emergency events 116 and handling emergency communications 102. At 402, an emergency event 116 may be determined. For example, determining network communication metadata 202 associated with a network 106 may be determined to exceed a threshold value. Continuing the example, network communication metadata 202 determined from a network 106 may indicate a quantity of voice communications 302 received within a time period, such as the previous hour. Network threshold data 208 may indicate a maximum count of voice communications 302 that may be accommodated by the network 106. The network threshold data 208 may also indicate a threshold count of voice communications 302 based on the maximum count. For example, the threshold count of voice communications 302 may include a percentage of the maximum count, a fixed quantity, a quantity within a range of the maximum count, and so forth. In other implementations, the network communication metadata 202 and network threshold data 208 may indicate a bandwidth associated with voice communications 302, a quantity of emergency communications 102, a bandwidth associated with emergency communications 102, a bandwidth or quantity associated with one or more other types of communications, a total quantity of bandwidth associated with the network 106, and so forth. In still other implementations, an emergency event 116 may be determined through user input, such as by receipt of a manual indication of an emergency event 116.

At 404, policy data 122 may be provided to one or more network devices 114 to cause the network devices 114 to handle communications associated with label data 104 according to a communication policy. For example, responsive to determination of an emergency event 116, a policy server 120 may generate policy data 122 that includes an indication of label data 104 and a policy regarding how communications associated with the label data 104 are to be handled. Continuing the example, the generated policy data 122 may include a policy indicating that communications having a particular label (e.g., "*A*") are to be transited using a high quality connection 124. The policy data 122 may be provided to one or more network devices 114. The network devices 114 may provide the policy data 122 to additional network devices 114.

At 406, emergency communications 102 may be determined based on correspondence between at least a subset of voice communications 302 associated with the network 106 and emergency data 214 that includes values indicative of emergency communications 102. For example, FIG. 4 illustrates an emergency communication 102 and a non-emergency communication 118 associated with the network 106. The emergency communication 102 may include any type of data provided to or received from law enforcement, medical personnel, rescue personnel, or other parties associated with an emergency event 116. For example, the emergency communication 102 may include a communication provided to an emergency call center using the dial string "911." In other implementations, the emergency communication 102 may include a communication provided to or received from a particular location affected by an emergency event 116, such as a structure within which a fire, criminal activity, or other emergency event 116 has been reported. In still other implementations, the emergency communication 102 may include communications containing content related to an emergency event 116, such as requests for assistance from injured persons, information regarding impassable routes, and so forth. In contrast, the non-emergency communication 118 may include data provided to or received from parties or locations not associated with the emergency event 116, or content unrelated to the emergency event 116.

During an emergency event 116, the policy server 120 may determine correspondence between the at least a portion of the emergency data 214 and at least a portion of the determined communications. Continuing the example, the emergency data 214 may include one or more dial strings indicative of an emergency event 116. FIG. 4 depicts the emergency data 214 including dial strings "911" and "112." In the depicted example, correspondence between the emergency data 214 and the emergency communication 102 may be determined, while no correspondence between the non-emergency communication 118 and the emergency data 214 may be determined.

At 408, label data 104 may be associated with determined emergency communication 102. In some implementations, at least a portion of an emergency communication 102 may be edited to associate the label data 104 with the emergency communication 102. For example, one or more of a SIP header, the body of an emergency communication 102, or another part of the emergency communication 102 may be edited to associate the label data 104 with the emergency communication 102. In other implementations, the label data 104 may be transmitted concurrently with the emergency communication 102 while the emergency communication 102 remains unedited. In some implementations, voice communications 302 for which correspondence with the emergency data 214 is not determined (e.g., non-emergency communications 118) may be provided with a different label data 104 configured to cause network devices 114 to transit these communications at a lower priority than other communications. For example, policy data 122 may include a first method for handing communications that are determined to be emergency communications 102 and a second method for handling communications that are determined to be non-emergency communications 118.

At 410, network devices 114 that determine the label data 104 may handle the emergency communications 102 according to the policy data 122. For example, one or more network devices 114 receiving the emergency data 102 may include one or more modules to detect and determine the label data 104 associated with the emergency communications 102. Responsive to determination of the label data 104, particular emergency communications 102 associated with the label data 104 may be handled by the network devices 114 in the manner indicated in the policy data 122. For example, the emergency communications 102 may be transited using a high quality connection 124.

Figure 5:
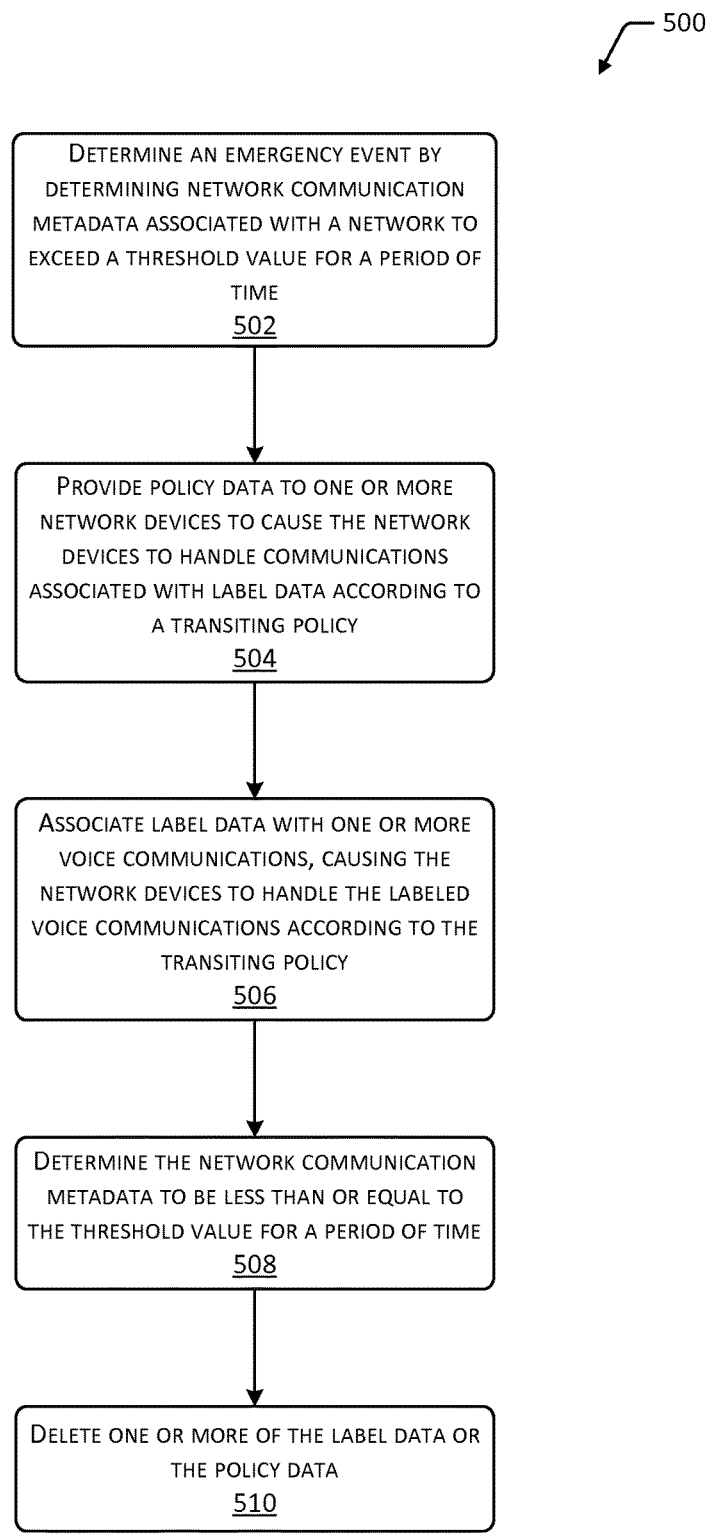
FIG. 5 is a flow diagram illustrating a method for determining an end to an emergency event and deleting one or more of label data or policy data.

FIG. 5 is a flow diagram 500 illustrating a method for determining an end to an emergency event 116 and deleting one or more of label data 104 or policy data 122.

Block 502 determines an emergency event 116 by determining network communication metadata 202 associated with a network 106 to exceed a threshold value for a period of time. For example, network threshold data 208 may include one or more threshold values associated with a network 106, such as threshold quantities of communications 328, a maximum bandwidth for voice communications 302 or other maximum allocated resources 332, and so forth. In some implementations, one or more values of the network threshold data 208 may include a corresponding period of time for which a value may be exceeded before determining an emergency event 116. Network communication metadata 202 may include a quantity or bandwidth associated with current communications 316 or previous communications 318 over a period of time. Correspondence between the network communication metadata 202 and the network threshold data 208 may be used to determine the emergency event 116. In some implementations, the network communication metadata 202 exceeding a value of the network threshold data 208 may indicate an emergency event 116. In other implementations, an emergency event 116 may be determined if the network communication metadata 202 is less than or equal to a threshold value, within a range of a threshold value, or outside a range of a threshold value. In still other implementations, an emergency event 116 may be determined manually, such as by user input.

Block 504 provides policy data 122 to one or more network devices 114 to cause the network devices 114 to handle communications associated with label data 104 according to a transiting policy 350. Policy data 122 may be generated by a policy generation module 210, which may provide the policy data 122 to one or multiple devices associated with a network 106. For example, the policy data 122 may be provided to a single device associated with a network 106, such as a SBC 112, which may in turn provide the policy data 122 to other network devices 114. In other implementations, the policy data 122 may be provided to multiple network devices 114 by the policy server 120. The policy data 122 may include a label indication 348, referencing label data 104 that may be associated with one or more voice communications 302. The policy data 122 may also include a transiting policy 350, which may include instructions regarding the manner in which network devices 114 are to handle voice communications 302 associated with the label data 104.

Block 506 associates label data 104 with one or more voice communications 302, causing the network devices 114 to handle the labeled voice communications 302 according to the transiting policy 350. For example, voice communications 302 may be determined from one or more of the network 106 or a source device 108. Correspondence between the determined voice communications 302 and emergency data 214 may be used to determine whether the label data 104 is associated with particular voice communications 302. Continuing the example, a voice communication 302 may include header data 304(1), a source identifier 306(1), a destination identifier 308(1), location data 310(1), or particular payload packets 312(1) that may correspond to stored emergency data 214. Responsive to this correspondence, the label data 104 may be associated with the voice communication 302. In some implementations, the label data 104 may be associated with a voice communication 302 by editing a portion of the voice communication 302, such as a SIP header of the voice communication 302. In other implementations, the label data 104 may be transited with the voice communication 302 without editing the voice communication 302.

Block 508 determines the network communication metadata 202 to be less than or equal to the threshold value for a period of time. After a quantity of communications 328 associated with an emergency event 116 decreases, the values associated with the network communication metadata 202 may no longer exceed one or more threshold values (e.g., the quantity of communications 328) associated with the network threshold data 208. If the values associated with the network communication metadata 202 remain less than or equal to values associated with the network threshold data 208 for a threshold period of time, this may indicate an end of the emergency event 116. In some implementations, the network threshold data 208 may include a first set of threshold values that relate to determining an emergency event 116 and a second set of threshold values different than the first set that relate to an end of the emergency event 116. In other implementations, an end to an emergency event 116 may be determined manually, such as through user input.

Block 510 deletes one or more of the label data 104 of the policy data 122 responsive to the end of the emergency event 116. Deletion of the policy data 122 or label data 104 may improve efficiency when compared to modifying multiple fields in existing label data 104 at the beginning and end of emergency events 116.

Figure 6:
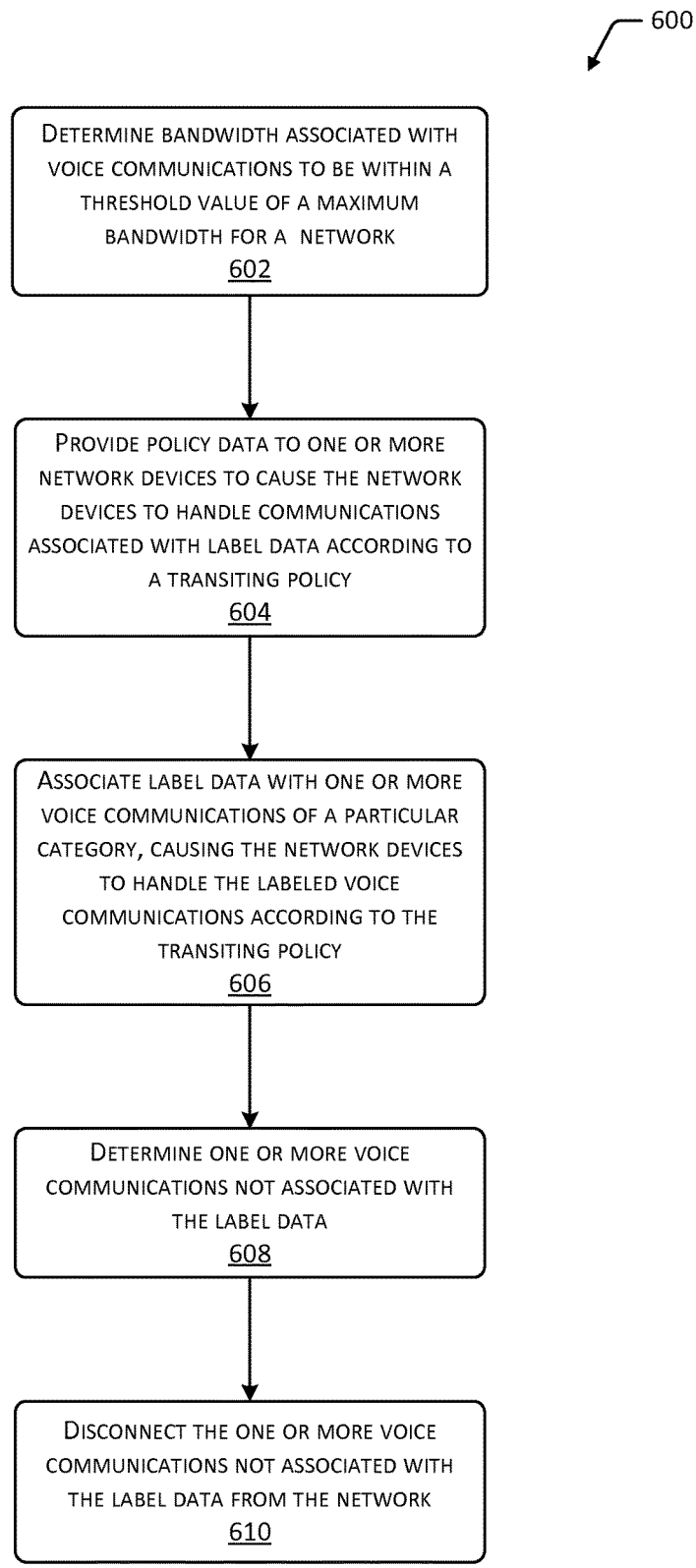
FIG. 6 is a flow diagram illustrating a method for determining one or more voice communications not associated with label data and disconnecting the one or more voice communications from the network.

FIG. 6 is a flow diagram 600 illustrating a method for determining one or more voice communications 302 not associated with label data 104 and disconnecting the one or more voice communications 302 from the network 106.

Block 602 determines a bandwidth associated with voice communications 302 to be within a threshold value of a maximum bandwidth for a network 106. For example, a network 106 may include a particular quantity of bandwidth that is allocated to voice communications 302. If a current quantity or bandwidth of voice communications 302 approaches the maximum bandwidth of a network 106 for voice communications 302, this may indicate an emergency event 116 or other type of event.

Block 604 provides policy data 122 to one or more network devices 114 to cause the network devices 114 to handle communications associated with label data 104 according to a transiting policy 350. As described previously with regard to FIGS. 3 and 5, policy data 122 may include a label indication 348 indicative of particular label data 104 and a transiting policy 350 including instructions regarding the manner in which communications associated with the label data 104 are to be handled. In some implementations, policy data 122 may include instructions regarding the manner in which communications not associated with the particular label data 104 are to be handled, and communications associated with label data 104 may be transited using normal operations of the network devices 114. In still other implementations, policy data 122 may include instructions regarding the manner in which both communications associated with label data 104 and communications not associated with label data 104 are handled.

Block 606 associates label data 104 with one or more voice communications 302 of a particular category, causing the network devices 114 to handle the labeled voice communications 302 according to the transiting policy 350.

Block 608 determines one or more voice communications 302 not associated with the label data 104. During an emergency event 116 or another type of event, bandwidth associated with voice communications 302 may exceed the bandwidth allocated for voice communications 302 within a network 106. The presence of voice communications 302 not associated with a selected category may negatively impact the quality and connectivity of voice communications 302 of the selected category. Therefore, the policy data 122 may be configured to cause network devices 114 to transit voice communications 302 of a selected category with greater quality, higher-priority routing, greater connectivity, and so forth.

Block 610 disconnects the one or more voice communications 302 not associated with the label data 104 from the network 106. In some implementations, the policy data 122 may include a transiting policy 350 configured to cause network devices 114 to transit voice communications 302 not associated with the label data 104 to be disconnected or to be transited with lower quality, lower-priority routing, lesser connectivity, and so forth. In other implementations, application of the transiting policy 350 to communications associated with the label data 104 may consume sufficient resources to cause the disconnection or the use of low quality connections 126 with other voice communications 302.

Figure 7:
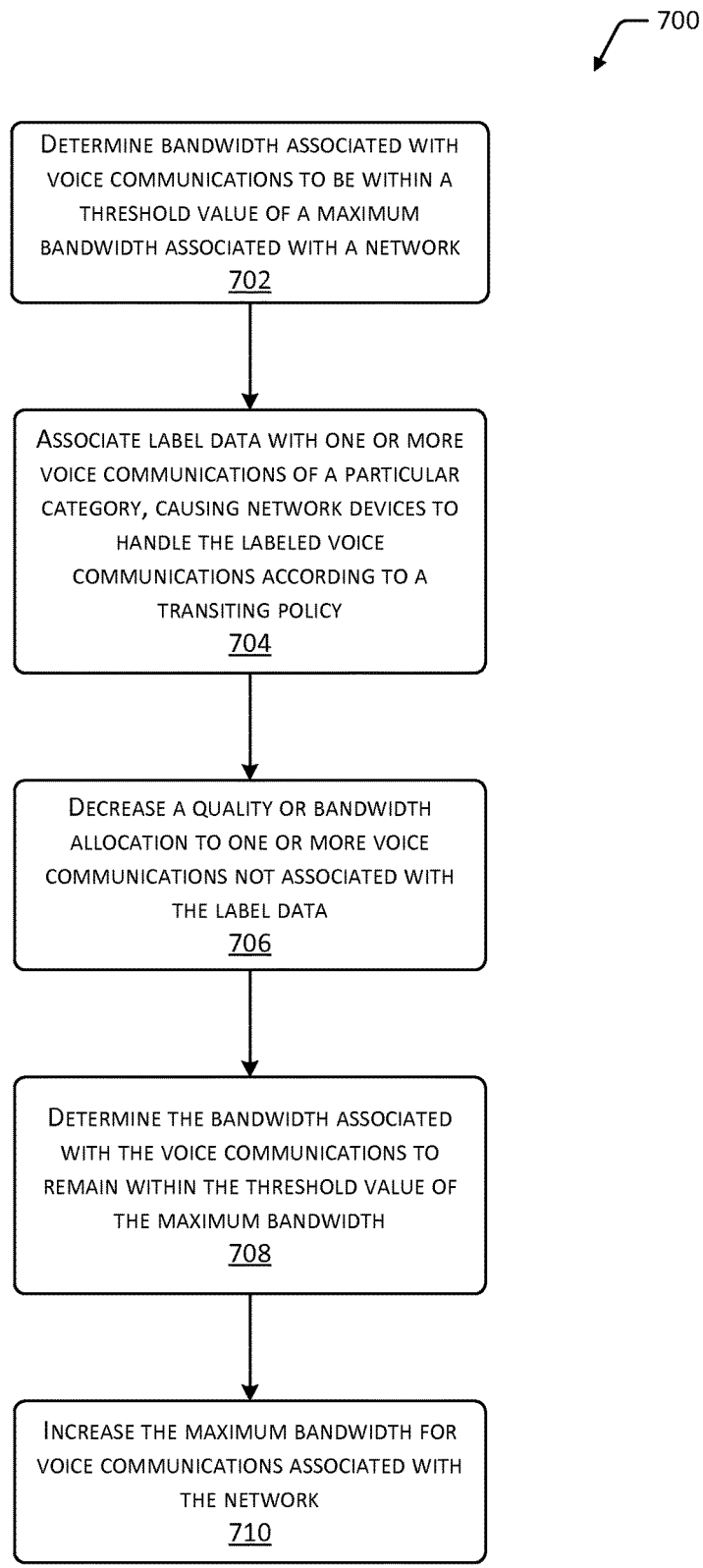
FIG. 7 is a flow diagram illustrating a method for determining when a bandwidth associated with voice communications remains within a threshold value of a maximum bandwidth and increasing the maximum bandwidth for voice communications associated with a network.

FIG. 7 is a flow diagram 700 illustrating a method for increasing the maximum bandwidth for voice communications 302 associated with a network 106. Block 702 determines a bandwidth associated with voice communications 302 to be within a threshold value of a maximum bandwidth associated with a network 106. As described previously with regard to FIG. 6, a network 106 may include a quantity of bandwidth that is allocated to support voice communications 302. If a current quantity or bandwidth of voice communications 302 approaches the maximum allocated quantity or bandwidth of a network 106, this may indicate an emergency event 116 or other type of event that may impact the quality or connectivity of voice communications 302.

Block 704 associates label data 104 with one or more voice communications 302 of a particular category, causing network devices 114 to handle the labeled voice communications 302 according to a transiting policy 350. For example, policy data 122 may be provided to network devices 114, the policy data 122 being configured to cause the network devices 114 to transit voice communications 302 associated with label data 104 in a particular manner. Continuing the example, voice communications 302 associated with label data 104 may be transited using a high quality connection 124 or a low quality connection 126. As another example, voice communications 302 associated with label data 104 may be routed before or after other types of voice communications 302.

Block 706 decreases a quality or bandwidth allocation to one or more voice communications 302 not associated with the label data 104. In some implementations, decreasing the quality or bandwidth allocated to a voice communication 302 may include disconnecting the voice communication 302 from the network 106. In other implementations, decreasing the quality or bandwidth allocated to a voice communication 302 may occur as a result of increasing the quality or bandwidth associated with other voice communications 302. Decreasing the quality or bandwidth allocated to voice communications 302 not associated with the label data 104 may increase the bandwidth and resources available for transiting voice communications 302 of the particular category.

Block 708 determines the bandwidth associated with the voice communications 302 to remain within the threshold value of the maximum bandwidth for the network 106. For example, during an event, a quantity of voice communications associated with a particular category may exceed the bandwidth allocated by a network 106 to support the transiting of voice communications 302. After decreasing the quality or bandwidth associated with at least a subset of the voice communications 302 or in some implementations, disconnecting one or more voice communications 302 from the network 106, the bandwidth associated with the remaining voice communications 302 may still remain within the threshold value of the maximum bandwidth.

Block 710 increases the maximum bandwidth for voice communications 302 associated with the network 106. The maximum bandwidth may be increased responsive to the determination that the bandwidth associated with voice communications 302 remains within the threshold value of the maximum bandwidth for the network 106, even after decreasing a quality or bandwidth allocation for other voice communications 302. In some implementations, increasing the bandwidth available for transiting voice communications 302 within a network 106 may include allocating an additional portion of resources associated with the network 106 to support the handling of voice communications 302. For example, one percent of a network's 106 maximum resources may be allocated to handling voice communications 302, while the remainder of the network's 106 resources is used to support other types of data. Block 710 may reallocate at least a portion of the network's 106 resources to support voice communications 302. In other implementations, a temporary increase to the bandwidth allocated to a network 106 may be requested from a network carrier or other entity associated with the network 106. For example, an entity may agree to increase resources allocated to a network 106 during an emergency event 116.

Figure 8:
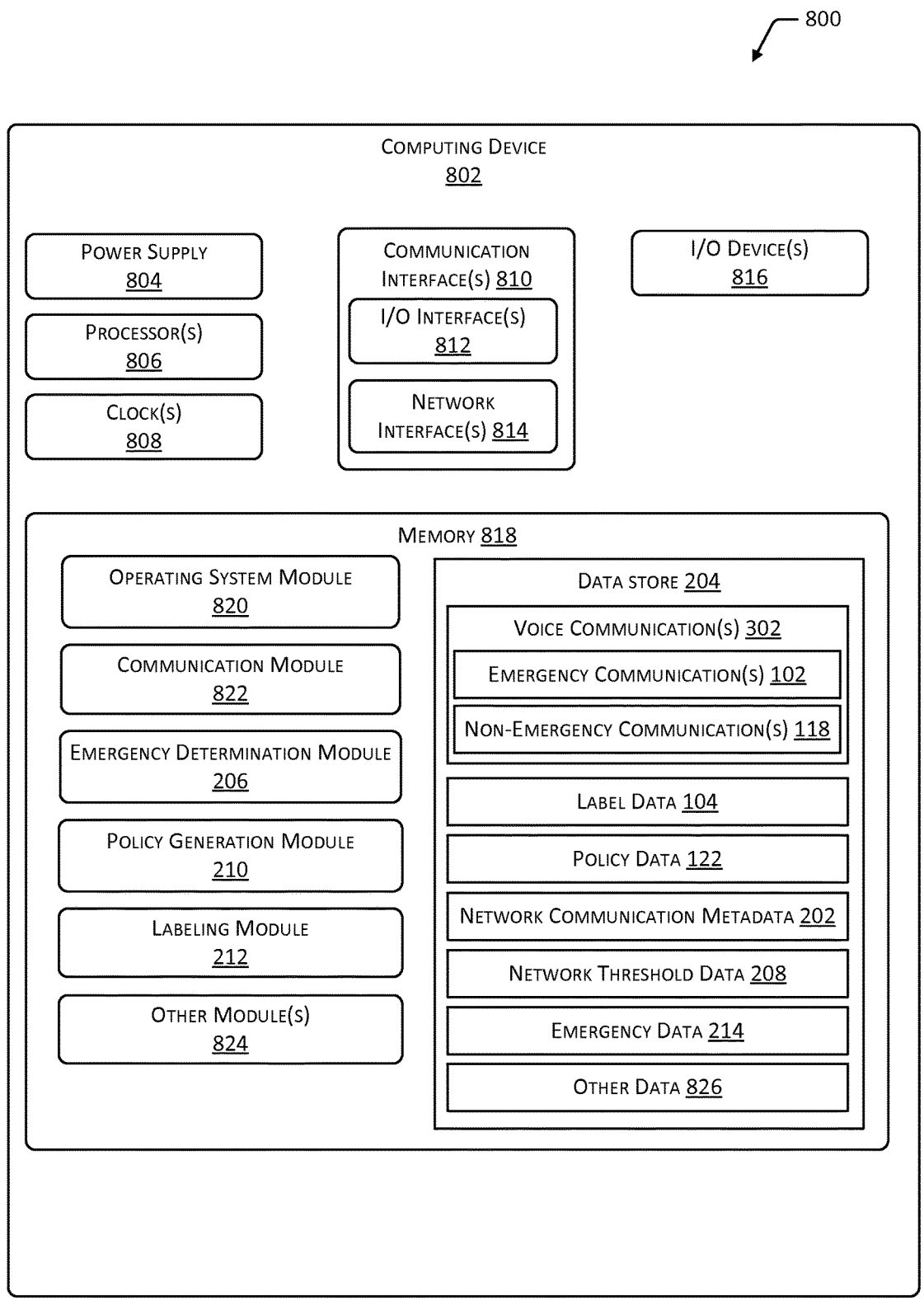
FIG. 8 is a block diagram illustrating a computing device within the scope of the present disclosure.

FIG. 8 is a block diagram 800 illustrating a computing device 802 within the scope of the present disclosure. The computing device 802 may include one or more user policy servers 120, network devices 114, SBCs 112, destination devices 110, or source devices 108.

One or more power supplies 804 may be configured to provide electrical power suitable for operating the components of the computing device 802. In some implementations, the power supply 804 may include a rechargeable battery, fuel cell, photovoltaic cell, power conditioning circuitry, and so forth.

The computing device 802 may include one or more hardware processor(s) 806 (processors) configured to execute one or more stored instructions. The processor(s) 806 may include one or more cores. One or more clocks 808 may provide information indicative of date, time, ticks, and so forth. For example, the processor(s) 806 may use data from the clock 808 to generate a timestamp, trigger a preprogrammed action, determine the times during which increased voice communications 302 are received, and so forth.

The computing device 802 may include one or more communication interfaces 810, such as input/output (I/O) interfaces 812, network interfaces 814, and so forth. The communication interfaces 810 may enable the computing device 802, or components of the computing device 802, to communicate with other computing devices 802 or components of the other computing devices 802. The I/O interfaces 812 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 812 may couple to one or more I/O devices 816. The I/O devices 816 may include any manner of input device or output device associated with the computing device 802. For example, I/O devices 816 may include touch sensors, keyboards, mouse devices, microphones, image sensors (e.g., cameras), scanners, displays, speakers, haptic devices, printers, and so forth. In some implementations, the I/O devices 816 may be physically incorporated with the computing device 802 or may be externally placed.

The network interfaces 814 may be configured to provide communications between the computing device 802 and other devices, such as the I/O devices 816, routers, access points, and so forth. The network interfaces 814 may include devices configured to couple to one or more networks including LANs, wireless LANs, WANs, wireless WANs, and so forth. For example, the network interfaces 814 may include devices compatible with Ethernet, Wi-Fi™, Bluetooth®, ZigBee®, Z-Wave, 3G, 4G, LTE, and so forth.

The computing device 802 may include one or more busses or other internal communications hardware or software that allows for the transfer of data between the various modules and components of the computing device 802.

As shown in FIG. 8, the computing device 802 may include one or more memories 818. The memory 818 may include one or more computer-readable storage media (CRSM). The CRSM may be any one or more of an electronic storage medium, a magnetic storage medium, an optical storage medium, a quantum storage medium, a mechanical computer storage medium, and so forth. The memory 818 may provide storage of computer-readable instructions, data structures, program modules, and other data for the operation of the computing device 802. A few example modules are shown stored in the memory 818, although the same functionality may alternatively be implemented in hardware, firmware, or as a system on a chip (SoC).

The memory 818 may include one or more operating system (OS) modules 820. The OS module 820 may be configured to manage hardware resource devices such as the I/O interfaces 812, the network interfaces 814, the I/O devices 816, and to provide various services to applications or modules executing on the processors 806. The OS module 820 may implement a variant of the FreeBSD™ operating system as promulgated by the FreeBSD Project; UNIX™ or a UNIX-like operating system; a variation of the Linux™ operating system as promulgated by Linus Torvalds; the Windows® operating system from Microsoft Corporation of Redmond, Wash., USA; or other operating systems.

A data store 204 and one or more of the following modules may also be stored in the memory 818. The modules may be executed as foreground applications, background tasks, daemons, and so forth. The data store 204 may use a flat file, database, linked list, tree, executable code, script, or other data structure to store information. In some implementations, the data store 204 or a portion of the data store 204 may be distributed across one or more other devices including other computing devices 802, network attached storage devices, and so forth.

A communication module 822 may be configured to establish communications with one or more other computing devices 802. The communications may be authenticated, encrypted, and so forth. For example, the communication module 822 may initiate SIP or RTP connections between devices, determine applicable protocols, configurations, and settings, and facilitate the transfer of data between computing devices 802.

The memory 818 may store the emergency determination module 206. The emergency determination module 206 may determine the presence or absence of an emergency event 116 based at least partially on correspondence between network communication metadata 202 and network threshold data 208. The network communication metadata 202 may be indicative of a quantity or bandwidth of current or previously completed voice communications 302 over a period of time. The network threshold data 208 may include threshold values for one or more portions of the network communication metadata 202 that may affect the quality and connectivity of voice communications 302 transited using the network 106. Correspondence between the network communication metadata 202 and the network threshold data 208 may be indicative of an emergency event 116.

The memory 818 may also store the policy generation module 210. Based at least partially on one or more of the determination of the emergency event 116, the network communication metadata 202, the network threshold data 208, or configurations associated with the policy server 120, the policy generation module 210 may generate policy data 122. The policy data 122 may include a label indication 348, indicative of particular label data 104. In some implementations, the policy generation module 210 may also generate the label data 104 associated with the policy data 122. The policy data 122 may also include a transiting policy 350. Transiting policies 350 may include any manner of instructions configured to cause a computing device 802 to handle a communication associated with the label data 104 in a particular manner.

The memory 818 may further store the labeling module 212. The labeling module 212 may determine emergency communications 102 based at least partially on correspondence between at least a portion of an emergency communication 102 and emergency data 214 indicative of fields or parameters associated with emergency communications 102. For example, the labeling module 212 may determine one or more of a SIP header, a dial string, a network address, a location, and so forth from an emergency communication 102. Correspondence between one or more portions of a voice communication 302 and the emergency data 214 may indicate that the voice communication 302 is an emergency communication 102. While the present disclosure describes emergency communications 102 and emergency data 214 as one implementation, in other implementations, the labeling module 212 may determine any category of communication based on at least a portion of that communication and corresponding data indicative of a particular category.

Responsive to determining that a voice communication 302 is an emergency communication 102 (or another category of communication), the labeling module 212 may associate the label data 104 with the emergency communication 102. In some implementations, associating the label data 104 with an emergency communication 102 may include adding the label data 104 to the emergency communication 102 as one or more of a header, a new field, a portion of the body of the communication, and so forth. In other implementations, associating the label data 104 with the emergency communication 102 may include editing or replacing a portion of the emergency communication 102 with the label data 104. In still other implementations, the associating the label data 104 with the emergency communication 102 may include transiting the label data 104 with the emergency communication 102. The label data 104 may be determined by one or more of the SBC 112 or the network devices 114 as the emergency communication 102 is transited within the network 106. Determination of the label data 104 by the SBC 112 or the network devices 114 may cause the SBC 112 or the network devices 114 to transit the emergency communication 102 in the manner indicated by the policy data 122.

Other modules 824 may also be present in the memory 818. For example, encryption modules may be used to encrypt and decrypt communications between computing devices 802. Authentication modules may be used to authenticate communications sent or received by computing devices 802. Logging and reporting modules may be used to generate logs and reports of completed and failed communications between computing devices 802. Other data 826 within the data store 204 may include user input data, such as configurations and settings associated with computing devices 802.

In different implementations, different computing devices 802 may have different capabilities or capacities. For example, policy servers 120 may have significantly more processor 806 capability and memory 818 capacity compared to the processor 806 capability and memory 818 capacity of source devices 108 or destination devices 110.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors configured to execute the computer-executable instructions to:
access communication metadata indicative of voice communications associated with a network;
determine an emergency based on the communication metadata exceeding a threshold value, wherein the threshold value is based at least partially on an available bandwidth of the network for voice communications;
generate a communication policy including:
an indication of label data indicative of emergency communications; and
policy data configured to cause one or more devices associated with the network to, responsive to the label data, transit the emergency communications prior to non-emergency communications using the available bandwidth of the network for voice communications and to transit the non-emergency communications subsequent to the emergency communications using the available bandwidth of the network for voice communications;
provide the communication policy to the one or more devices associated with the network;
determine correspondence between an emergency communication and one or more identifiers indicative of the emergency communications; and
associate the label data with the emergency communication, wherein the one or more devices associated with the network, responsive to the label data and the communication policy, determine the label data and transit the emergency communication using the available bandwidth of the network prior to transiting non-emergency communications using the available bandwidth of the network.

2. The system of claim 1, further comprising computer-executable instructions to modify at least a portion of a session initiation protocol header associated with the emergency communication to include the label data.

3. The system of claim 1, wherein the threshold value includes one or more of:
a rate of change associated with the count of emergency communications; or
a rate of change associated with the bandwidth of the emergency communications.

4. The system of claim 1, wherein the available bandwidth of the network for transiting the emergency communications and the available bandwidth of the network for transiting the non-emergency communications include a same portion of the network.

5. A method comprising:
determining an event associated with a network including a particular portion associated with transit of at least a first category and a second category of communications;
based at least partially on determination of the event, generating a communication policy associated with the first category of communications, wherein the communication policy is configured to cause one or more devices receiving communications associated with the first category to provide a first subset of the communications with a communication characteristic including one or more of a timing or a quality associated with transiting of the communications associated with the first category using the particular portion of the network;
determining correspondence between one or more identifiers indicative of the category and the first subset of the communications; and associating label data indicative of the first category with the first subset of the communications based at least partially on the correspondence, wherein, responsive to the label data, the one or more devices provide the first subset of the communications with the communication characteristic and transit the first subset of the communications using the particular portion of the network, and wherein the one or more devices transit a second subset of the communications, that lack the label data and are associated with the second category, without the communication characteristic, using the particular portion of the network.

6. The method of claim 5, wherein determining the event includes determining a bandwidth associated with the communications is greater than or equal to a threshold portion of a maximum bandwidth associated with the network.

7. The method of claim 5, wherein determining the event includes determining a rate of change of a quantity of communications associated with the category exceeds a threshold rate of change.

8. The method of claim 5, the one or more identifiers including network addresses of devices associated with the network, wherein determining correspondence between the one or more identifiers and the at least a subset of the communications includes:
  determining one or more of a network address associated with a sending device or a network address associated with a receiving device associated with the at least a subset of the communications; and
  determining correspondence between the one or more of the network address associated with the sending device or the network address associated with the receiving device and network addresses of devices associated with the network.

9. The method of claim 5, further comprising transmitting the label data to the one or more devices concurrent with the at least a subset of the communications.

10. The method of claim 5, wherein the first category of communications includes emergency communications and the second category of communications includes non-emergency communications, the communication characteristic including one or more of: increased communication quality or transiting of the at least a subset of the communications of the first category prior to transiting at least one non-emergency communication.

11. The method of claim 5, wherein the first category of communications includes non-emergency communications and the second category of communications includes emergency communications, the communication characteristic including one or more of: decreased communication quality or transiting of the at least a subset of the communications of the first category subsequent to transiting at least one emergency communication.

12. The method of claim 5, further comprising:
  determining one or more values of communication metadata indicative of communications associated with the network to be less than or equal to a threshold value; and
  deleting one or more of the communication policy or the label data.

13. A system comprising:
  one or more memories storing computer-executable instructions; and
  one or more hardware processors configured to execute the computer-executable instructions to:
    determine an emergency based at least partially on one or more values of communication metadata indicative of communications associated with a network including a particular portion associated with transit of emergency and non-emergency communications;
    responsive to the emergency, generate a communication policy configured to cause one or more devices receiving emergency communications to provide the emergency communications with a communication quality greater than that of the non-emergency communications and to transit the emergency communications and the non-emergency communications using the particular portion of the network;
    associate label data with at least one emergency communication, wherein the label data is configured to cause devices associated with the network to determine the emergency communications from the non-emergency communication; and
    provide the at least one emergency communication and the label data to a device associated with the network, wherein responsive to the label data, the one or more devices transit the emergency communications with the communication quality using the particular portion of the network, and the one or more devices transit the non-emergency communications without the communication quality using the particular portion of the network.

14. The system of claim 13, further comprising computer-executable instructions to:
  responsive to the emergency, determine at least one non-emergency communication; and
  modify the at least one non-emergency communication by one or more of:
    decreasing a communication quality of the at least one non-emergency communication;
    transiting the at least one non-emergency communication subsequent to the at least one emergency communication; or
    disconnecting the at least one non-emergency communication from the network.

15. The system of claim 13, further comprising computer-executable instructions to:
  determine a bandwidth associated with the voice communications exceeds a threshold value based on a maximum bandwidth for voice communications associated with the network;
  increase the maximum bandwidth;
  determine an end of the emergency based at least partially on the one or more values of the communication metadata; and
  decrease the maximum bandwidth.

16. The system of claim 13, further comprising computer-executable instructions to:
  determine an end of the emergency based at least partially on the one or more values of the communication metadata; and
  delete the label data.

17. The system of claim 16, wherein the computer-executable instructions to determine the end of the emergency include computer-executable instructions to determine one or more of:
  a quantity of emergency communications to be less than a threshold quantity for a period of time; or
  a quantity of bandwidth of voice communications to be less than a threshold quantity of bandwidth associated with the network for the period of time.

18. The system of claim 13, wherein
  the communication policy includes:

an indication of the label data for enabling the one or more devices associated with the network to determine the emergency communication based on the label data; and routing instructions for causing the one or more devices to determine the label data associated with the at least one emergency communication and to transit the emergency communication with the communication quality greater than that of non-emergency communications responsive to the label data; and provide the communication policy to the one or more devices.

19. The system of claim 13, wherein the computer-executable instructions to determine the emergency based at least partially on the one or more values of the communication metadata include computer-executable instructions to determine one or more of:

a rate of change associated with the quantity of emergency communications to exceed a threshold rate; or a rate of change associated with quantity of bandwidth of voice communications to exceed a threshold rate of change associated with the network.

20. The system of claim 13, further comprising computer-executable instructions to:

determine the at least one emergency communication based on one or more of:
  a network address associated with a sending device;
  a network address associated with a receiving device;
  a telephone number associated with the at least one emergency communication; or
  one or more fields of a session initiation protocol header.

* * * * *